(12) United States Patent
Dantkale et al.

(10) Patent No.: US 9,760,392 B1
(45) Date of Patent: Sep. 12, 2017

(54) ADAPTIVE THROTTLING IN HYBRID STORAGE ENVIRONMENTS

(71) Applicant: Veritas Technologies LLC, Mountain View, CA (US)

(72) Inventors: Suhas Dantkale, Sunnyvale, CA (US); Prasanna V. Wakhare, Nagpur (IN); Chaitanya Yalamanchili, Santa Clara, CA (US); Christopher Uhler, Palo Alto, CA (US); Satyendra Thakur, San Jose, CA (US); Niranjan S. Pendharkar, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/840,627

(22) Filed: Aug. 31, 2015

(51) Int. Cl.
*G06F 9/455* (2006.01)
*G06F 13/20* (2006.01)

(52) U.S. Cl.
CPC .......... *G06F 9/45558* (2013.01); *G06F 13/20* (2013.01); *G06F 2009/45579* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 2005/0088977 A1* | 4/2005 | Roch | H04L 12/4641 370/254 |
| 2008/0259796 A1* | 10/2008 | Abousleman | H04L 47/10 370/233 |
| 2015/0163148 A1* | 6/2015 | Harmatos | H04L 47/762 370/235 |
| 2016/0134544 A1* | 5/2016 | Roy | H04L 47/10 370/235 |

* cited by examiner

*Primary Examiner* — Charlie Sun
(74) *Attorney, Agent, or Firm* — Campbell Stephenson LLP

(57) ABSTRACT

Various systems, methods, and processes to perform adaptive throttling of write operations in hybrid storage environments are disclosed. A credit value is assigned to a virtual machine. Input/output (I/O) operations generated by an application executing on the virtual machine are throttled based on the credit value assigned to the virtual machine. The credit value is assigned to the virtual machine in proportion to static measures and dynamic conditions. The static measures and the dynamic conditions are used to calculate a quality of service provided to the virtual machine by a storage system.

19 Claims, 14 Drawing Sheets

| Virtual Machine Identifier Field 230 | Service Level Agreement Field 410 | Priority Level Field 420 | Demand Level Field 430 | Quality of Service Field 440 | Credit Value Field 450 | Throttling Field 460 |
|---|---|---|---|---|---|---|
| VM 230(1) | PLATINUM | 10 | 10 | Bad | 10 | Very Low |
| VM 230(2) | GOLD | 7.5 | 8 | Average | 30 | Low |
| VM 230(3) | SILVER | 5 | 2 | Good | 90 | High |
| VM 230(4) | BRONZE | 2.5 | 9 | Good | 80 | minIOPS |
| • • • | • • • | • • • | • • • | • • • | • • • | • • • |
| VM 230(N) | GOLD | 7.5 | 6 | Average | 60 | Moderate |

ADAPTIVE THROTTLING IN HYBRID STORAGE ENVIRONMENTS

FIELD OF THE DISCLOSURE

This disclosure is related to hybrid storage systems. In particular, this disclosure is related to adaptive throttling of input/output (I/O) operations in hybrid storage environments.

DESCRIPTION OF THE RELATED ART

Data storage is becoming more complex. Users now can choose between a hard disk drive (HDD), a solid-state drive (SSD), and solid-state hard disk (SSHD) (which combines HDD and SSD technology into a single hybrid drive). Storage systems that implement such hybrid drives are typically referred to as hybrid (or converged) storage systems.

Generally, the purpose of a SSD in a hybrid storage system is to act as a cache for the data stored on a HDD, thus improving the overall performance of the storage system by maintaining copies of the most frequently used data on the SSD. Therefore, a hybrid storage system typically implements multiple storage tiers (or layers) in a hierarchy. For example, an SSD, given the SSD's speed-based advantage, can be provisioned in a first storage layer in the hierarchy for caching, and the HDD, given the HDD's larger size, can be provisioned in another storage layer in the hierarchy for data storage (e.g., as a backing data store).

A hybrid storage system can be implemented in a virtual computing environment and can be utilized by virtual machines for the purpose of caching and data storage. For example, virtual machines executing applications can each can perform input/output (I/O) operations to an SSD in a hybrid storage system. In some virtual computing environments that utilize hybrid storage systems, such virtual machines can also be associated with a Service Level Agreement (SLA) that quantifies the storage performance required by the virtual machine, and the minimum storage performance that the virtual machine will accept (e.g., in terms of input/output operations per second (IOPS)). However, because an SSD is typically smaller in size compared to a HDD, I/O operations to the SSD from these virtual machines can quickly consume (and exhaust) the available storage resources of the SSD, thus overflowing the SSD.

I/O throttling is one method that can be used to slow down the rate at which I/O operations are performed to the SSD. In doing so, I/O throttling can be helpful in preserving (or maintaining) the limited storage resources of an SSD. However, if multiple virtual machines are throttled at the same time or in the same manner, there is a risk that one or more of such virtual machines will fail to meet their respective SLA(s). Therefore, arbitrary or indiscriminate throttling of virtual machine I/O operations in a hybrid storage environment is not preferable.

SUMMARY OF THE DISCLOSURE

Disclosed herein are computerized methods, systems, and processes to perform adaptive throttling of write operations in hybrid storage environments. One such method involves assigning a credit value to a virtual machine, and throttling input/output (I/O) operations generated by an application executing on the virtual machine based on the credit value.

In one embodiment, the credit value is assigned to the virtual machine in proportion to static measures and dynamic conditions. For example, an input can be received that includes information indicative of the quality of service, and based on the input, the credit value can be assigned to the virtual machine. In this example, the static measures and the dynamic conditions are used to calculate the quality of service.

In another embodiment, the quality of service is a level of storage service provided to the virtual machine by a storage system. In this example, the static measures indicate a priority level of the virtual machine, and the dynamic measures indicate a demand level of the virtual machine. In other examples, the virtual machine is one of multiple virtual machines. Each virtual machine can execute one or more applications that generate separate I/O operations to a storage system (e.g., to a SSD, or to a first storage layer).

In some embodiments, the calculation of the quality of service includes comparing the priority level and the demand level associated with the virtual machine to another priority level and another demand level associated with another virtual machine. As a result of the comparing, another credit value is assigned to the another virtual machine that is different than the credit value assigned to the virtual machine. In this example, another application executing on the another virtual machine generates another set of I/O operations to the storage system. As a result of assigning the another credit value, the another set of I/O operations are throttled based on the another credit value.

In one embodiment, the storage system is a multi-layer storage device that includes multiple storage layers that represent a hierarchy of storage layers. In this example, a first storage layer in the hierarchy of storage layers receives the I/O operations prior to another storage layer in the hierarchy of storage layers. The first storage layer also includes a front end log.

In other embodiments, the another storage layer is a backing data store, the I/O operations are not permanently stored on the first storage layer, and the first storage layer includes a first storage device that serves the I/O operations faster but is smaller in size than another storage device in the another storage layer.

In some embodiments, the application executing on the virtual machine performs the I/O operations. The I/O operations are executed on the first storage layer, and include write operations that are written to the front end log maintained in the first storage layer. Data written by the write operations to the front end log is transferred from the first storage layer to another storage layer for backup.

In other embodiments, the demand level of the virtual machine is based on a first set of device characteristics of the first storage layer, and another set of device characteristics of the another storage layer, as well as a first set of operational characteristics of the first storage layer, and another set of operational characteristics of the another storage layer. The first set of operational characteristics include a first latency associated with the first storage layer, and the another set of operational characteristics include another latency associated with the another storage layer. In this example, the sum of all I/O operations generated by the applications executing on the virtual machines does not exceed a bandwidth of the another storage layer.

In one embodiment, the priority level of the virtual machine is based on a Service Level Agreement (SLA) with which the virtual machine is associated. The throttling is performed based on the credit value assigned to the virtual machine, and watermark levels associated with the front end log. In this example, the performance of the throttling does not negatively impact the SLA. Therefore, as a result of the throttling, the virtual machine is able to meet the static measures in the SLA.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
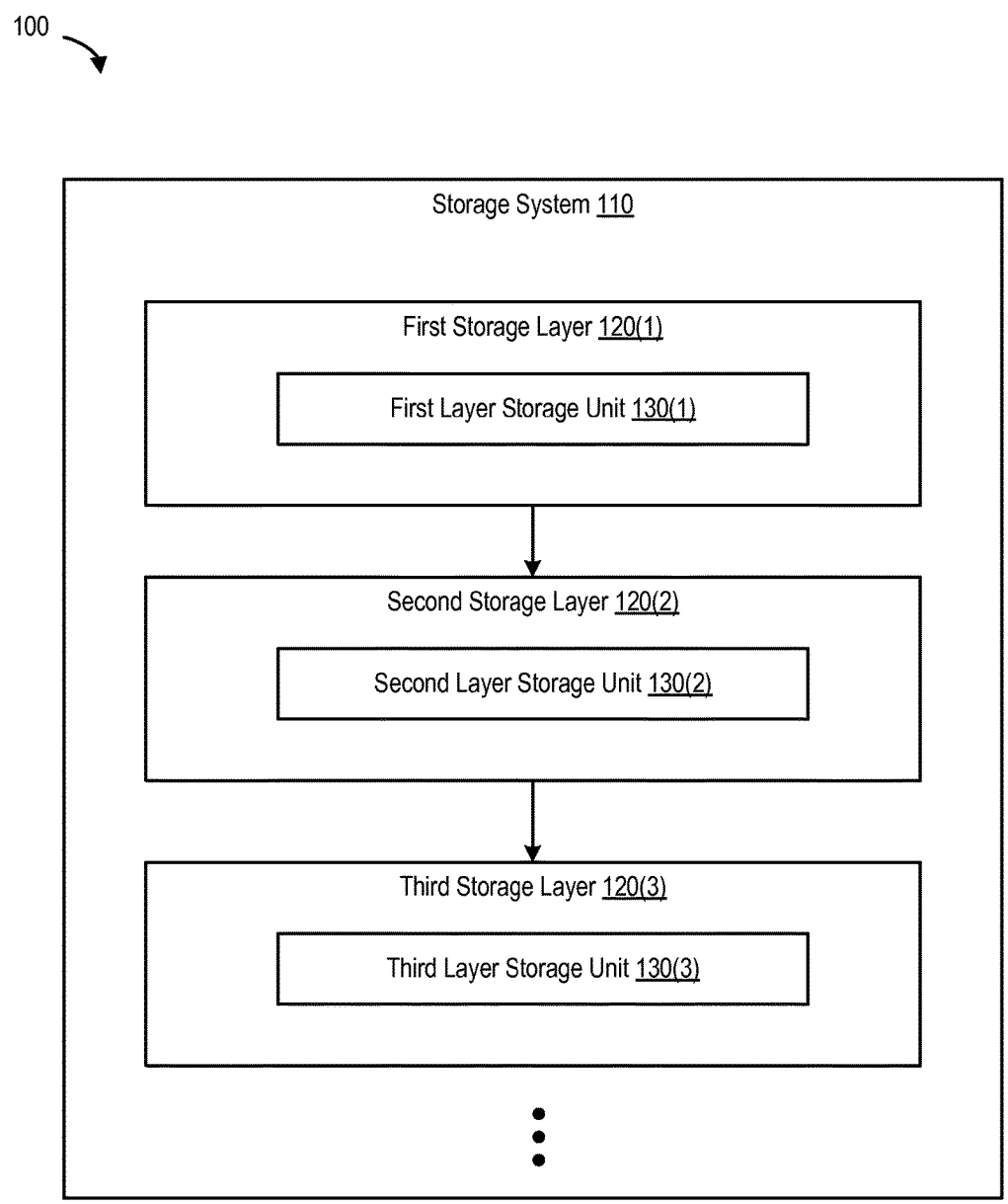
FIG. 1 is a block diagram of a hierarchical multi-layer storage system, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Data storage in modern computing environments is becoming more complex. Users of modern storage systems can now choose between a hard disk drive (HDD), a solid-state drive (SSD), or a solid-state hard disk (SSHD). SSHD combines HDD and SSD technology into a single hybrid drive. Such hybrid drives combine the speed of an SSD and the cost-effective storage capacity of a HDD. An SSD (e.g., flash storage) in a hybrid drive can be provisioned as a cache for data stored on the HDD, thus improving overall storage and system performance by maintaining copies of the most frequently used data on the SSD.

Hybrid drives in hybrid storage systems can be implemented as dual-drive hybrid systems or as solid-state hybrid drives. Dual-drive hybrid systems use separate SSD and HDD devices. On the other hand, in solid-state hybrid drives, SSD and HDD functionalities are built into the same physical storage device. In addition, an SSD which is provisioned as a cache in a hybrid drive can be hardware-managed, or software-managed. For example, in a hardware-managed hybrid drive, the SSD is managed by the drive. On the other hand, in a software-managed hybrid drive, the SSD is managed by a host.

Therefore, a hybrid storage system can include one or more HDDs and one or more SSDs, and can include hardware-managed SSHDs or software-managed SSHDs. Typically, HDDs provide high capacity at low cost but suffer from high latency and lower throughput compared to SSDs. SSDs provide higher performance but an SSD's capacity generally costs more than a HDD's capacity. However, SSHDs provide the capacity of a HDD and the performance of an SSD—but at a cost closer to the HDD. Consequently, it is advantageous to use a hybrid drive in a hybrid storage environment for caching and data storage.

An SSD in such a hybrid storage system can be provisioned as intermediate storage for the data stored on a HDD. Therefore, because a hybrid storage system contains multiple storage devices (or storage units), a hybrid storage system typically implements multiple storage tiers (or layers) in a hierarchy. For example, an SSD, given the SSD's speed-based advantage, is generally provisioned in a first storage layer (e.g., for queueing), and the HDD, given the HDD's size-based advantage, is generally provisioned as a secondary (or another) storage layer for data storage (e.g., as a backing data store).

It should be noted that other types of storage devices other than SSDs and HDDs can also be implemented and provisioned in the hierarchy of the multiple storage layers. In addition, it should also be noted that a storage system (e.g., a hybrid storage system) can implement multiple storage layers (e.g., more than two), each with multiple storage devices (or storage units), and/or each with more than one type of storage device (or storage unit).

A hybrid storage system can be implemented for storage utilization in a virtual computing environment. For example, one or more virtual machines (executing one or more applications) can access a first storage layer of the multiple storage layers in a hybrid drive for caching by performing input/output (I/O) operations (generated by the applications) to a first layer storage unit (e.g., an SSD, a front end log, or the like) in the first storage layer of the hybrid storage system (e.g., by writing the I/O operations to the first layer storage unit).

However, because the first layer storage unit is typically smaller in size than another storage unit implemented in another storage layer, I/O operations to the first layer storage unit from these virtual machines can quickly consume (exhaust) available storage resources of the first layer storage unit, thus overflowing storage structures in the first layer storage unit.

It is possible that the I/O operations that overflow from the first layer storage unit can be permitted to overflow onto another storage unit in another storage layer (e.g., to another HDD). However, this solution can be problematic. For instance, extending a front end log onto a HDD slows down incoming write operations (or, more simply, writes) (e.g., from the virtual machines). It should also be noted that because another storage unit (e.g., a HDD) in another storage layer is typically used as a backing storage unit, incoming writes are ultimately secured (or written) to this another storage unit asynchronously compared to the application.

Therefore, under operating conditions without storage overflow, the application that generates the writes is generally not affected by the high latency of another storage unit (e.g., a HDD) because the writes from the first layer storage unit are flushed to this other storage unit asynchronously (e.g., transfer of writes from the SSD to the HDD does not take place in the same order in which the application generates the writes). Unfortunately, performing writes directly to another storage unit (e.g. a HDD) on a secondary storage layer (e.g., other than the first storage layer) in case of storage overload (e.g., when a first storage unit (e.g., an SSD) in a first storage layer overflows due to storage exhaustion), causes the high latency of this another storage unit (e.g., a HDD) to negatively affect system and application performance (e.g., by slowing down incoming writes).

It is also possible that I/O throttling can be used to slow down (or hold) I/O operations that pose a risk of exhausting storage resources of the first layer storage unit (e.g., an SSD). However, this solution can also be problematic, particularly in the context of Service Level Agreements (SLAs).

Virtual machines implemented in virtual computing environments are often subject to (and associated with) an SLA. An SLA can quantify the storage, processing, throughput, and other such performance required by a virtual machine, and minimum performance metrics that the virtual machine will accept. For example, the SLA can define a virtual machine workload (e.g., one or more applications executing on that virtual machine), and so, the maximum number of input/output operations per second (IOPS) allowed, and can also specify a minimum number of IOPS that a given virtual machine is to tolerate.

In addition, the SLA can also specify the maximum and minimum latency that the application executing on the virtual machine will tolerate. This type of latency refers to the amount of time a single I/O operation takes to complete, from the perspective of the application (e.g., the amount of time it takes for a write to complete on a SSD and for the application to receive acknowledgement of the write's completion).

Unfortunately, if multiple virtual machines are throttled at the same time or in the same manner (e.g., if the same number of I/O operations are prevented from being written by all virtual machines), there is a risk that one or more of such virtual machines will fail to meet one or more requirements specified in their SLAs. For example, performing I/O throttling on a workload associated with a virtual machine can prevent the virtual machine from making the required number of IOPS (e.g., a minimum IOPS) and/or can result in a latency that is higher than what the virtual machine is willing to tolerate. As such, one or more of different virtual machines with different SLAs can fail, if all such virtual machines are throttled the same.

Moreover, arbitrary I/O throttling of virtual machine workloads in hybrid storage environments does not take into account the priority of one application executing on one virtual machine over another application executing on another virtual machine (e.g., throttling in this arbitrary manner is not proportional to the relative importance of the application), nor does such a methodology make a distinction between throttling write operations versus read operations. In addition, such arbitrary throttling also does not take the requested deadline of a given I/O operation into consideration. Consequently, the resulting latency experienced by virtual machines accessing the hybrid storage system can be somewhat random in nature.

Therefore, arbitrary, random, and/or indiscriminate throttling of virtual machine I/O operations is not advisable and/or preferable because of the foregoing problems. Disclosed herein are methods, systems, and processes to perform adaptive throttling of write operations in hybrid storage environments. Adaptive throttling of write operations can be performed based on a quality of service provided by the hybrid storage system to the virtual machine workloads, while taking into consideration the virtual machine's SLA requirements, the virtual machine's current I/O demand, and the virtual machine's workload-based priorities, among other metrics.

An Example Multi-Layer Storage Architecture

FIG. 1 is a block diagram of a hierarchical multi-layer storage system, according to one embodiment. FIG. 1 illustrates a storage system that includes multiple storage layers. For example, storage system 110 includes first storage layer 120(1), second storage layer 120(2), and third storage layer 120(3). As shown, first storage layer 120(1) includes first layer storage unit 130(1), second storage layer 120(2) includes second layer storage unit 130(2), and third storage layer 120(3) includes third layer storage unit 130(3).

It is noted that storage system 110 can include more storage layers other than the storage layers shown in FIG. 1. For example, storage system 110 can include more than three storage layers. It is also noted that each of the storage layers can include more than more storage unit. For example, second storage layer 120(2) can include other storage units in addition to second layer storage unit 130(2).

An Example Hybrid Storage Architecture

Figure 2:
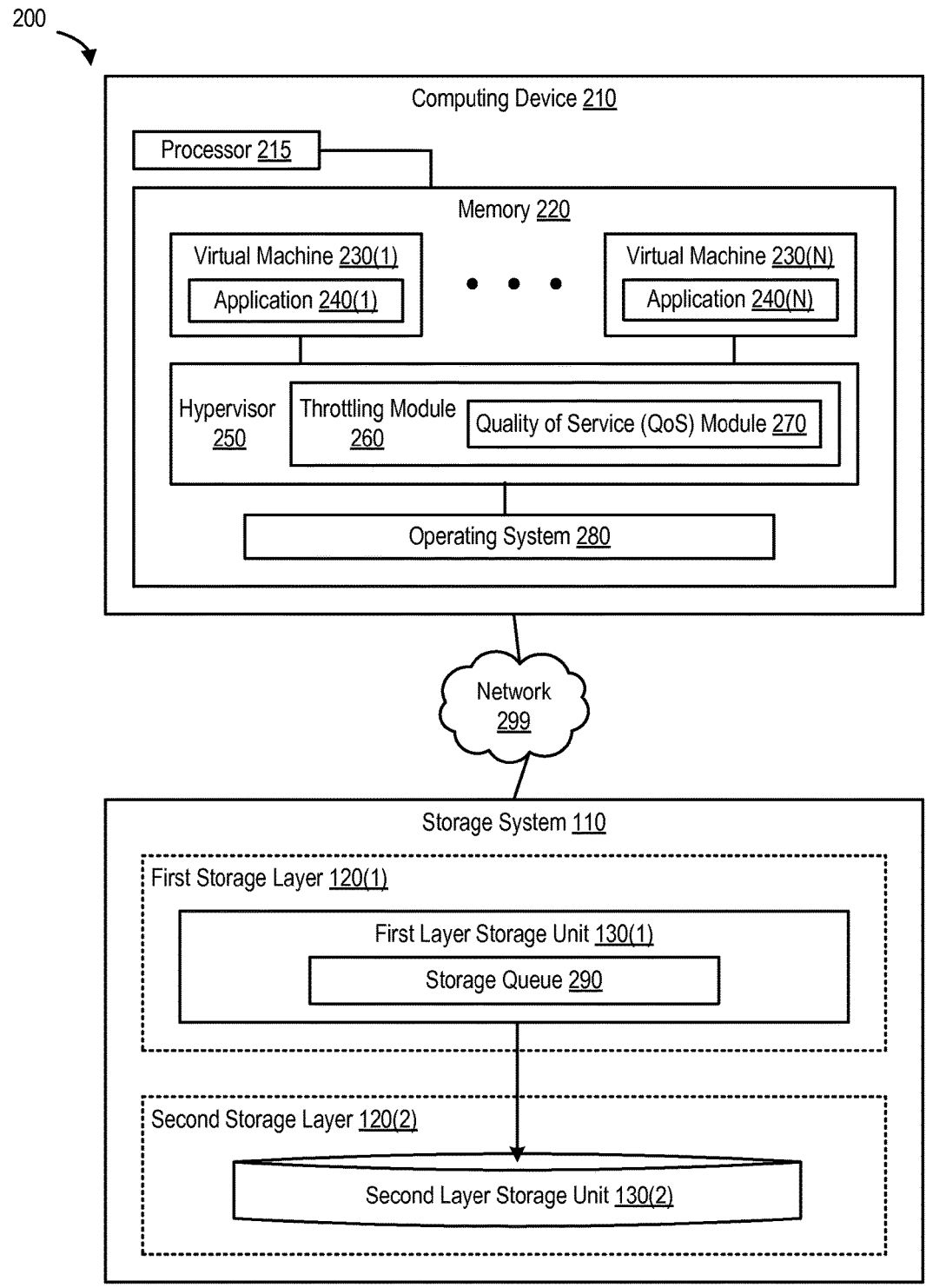
FIG. 2 is a block diagram of an example computing system that can perform adaptive I/O throttling, according to one embodiment of the present disclosure.

FIG. 2 is a block diagram of a hybrid storage system communicatively coupled to computing device that implements a throttling module, according to one embodiment. Computing device 210 includes a processor 215 and a memory 220. Computing device 210 can be any type of computing device including a server (physical or virtual), a desktop, a laptop, a tablet, and the like.

Memory 220 implements the computing environment necessary to perform adaptive throttling of write operations. As shown, memory 220 includes virtual machines 230(1)-(N). Virtual machines 230(1)-(N) execute applications 240(1)-(N), respectively. However, it should be noted that in some embodiments virtual machine 230(1) can execute one or more applications in addition to application 240(1). Similarly, virtual machine 230(N) can also execute one or more applications in addition to application 240(N). Virtual machines 230(1)-(N) can also execute one or more instances of the same application(s).

Memory 220 also implements a hypervisor 250 and an operating system 280. As shown in FIG. 2, hypervisor 250 can be implemented, for example, using software. However, hypervisor 250 can also be a native or bare-metal hypervisor. Hypervisor 250 also implements a throttling module 260, which further implements a Quality of Service (QoS) module 270.

FIG. 2 also illustrates storage system 110. It should be noted that the various storage layers of storage system 110 can include a storage appliance and/or can include one or more of a variety of different storage devices, including hard drives, compact discs, digital versatile discs, SSDs, memory such as Flash memory, a storage array, or the like. Storage system 110 can also include a storage management module (not shown) that can provide an interface between storage system 110 and computing device 210 via network 299. It is noted that any other appropriate network or interconnection can be used instead of and/or in addition to network 299.

As shown in FIG. 2, storage system 110 includes first storage layer 120(1) and second storage layer 120(2). First storage layer 120(1) includes first layer storage unit 130(1), and second storage layer 120(2) includes second layer storage unit 130(2). First storage layer 120(1) also includes a storage queue 290.

In some embodiments, first storage layer 120(1) and second storage layer 120(2) represent a hierarchy of storage layers within storage system 110. For example, an I/O operation from computing device 210, received via network 299, is first received at first storage layer 120(1) and written to first layer storage unit 130(1) before it is transferred to second storage layer 120(2) to be written to second layer storage unit 130(2). In this example, and in one embodiment, first layer storage unit 130(1) is a SSD, and second layer storage unit 130(2) is a HDD. However, in other examples, and in other embodiments, first layer storage unit 130(1) can simply be any storage unit (or storage device) that is faster than second layer storage unit 130(2), and second layer storage unit 130(2) can simply be any storage unit (or storage device) that has a larger storage capacity than first layer storage unit 130(1). Therefore, in this manner, storage system 110 provides a hybrid storage environment to computing device 210, and in particular, to virtual machines 230(1)-(N).

Performing Adaptive Throttling

Figure 3:
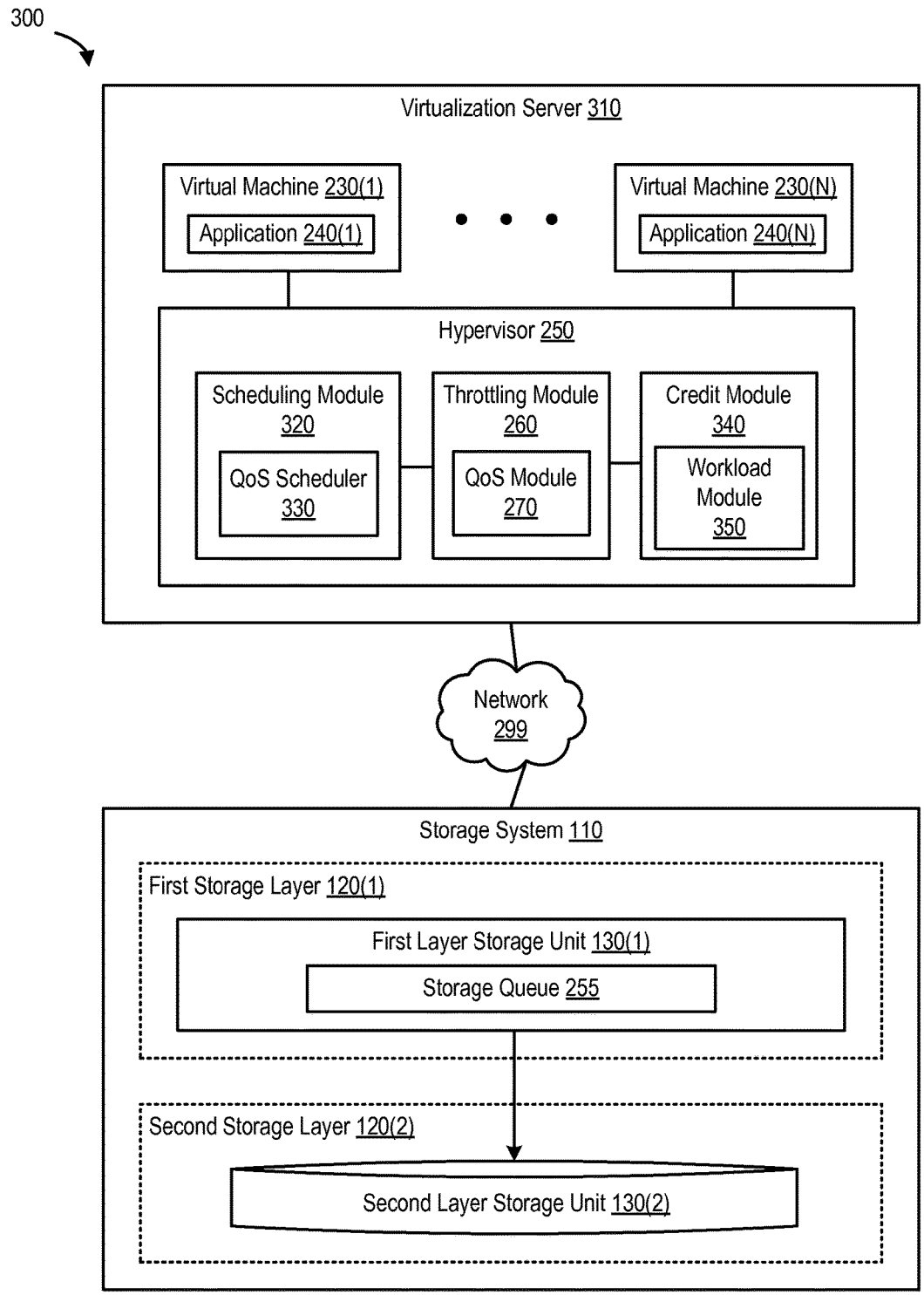
FIG. 3 is a block diagram of a virtualization server that implements a throttling module, according to one embodiment of the present disclosure.

FIG. 3 is a block diagram of a virtualization server that implements a throttling module, according to one embodiment. Virtualization server 310 implements virtual machines 230(1)-(N). In turn, virtual machines 230(1)-(N) implement applications 240(1)-(N). In some embodiments, virtual machine 230(1) can execute one or more applications in addition to application 240(1). Similarly, virtual machine 230(N) can also execute one or more applications in addition to application 240(N). Virtual machines 230(1)-(N) can also execute one or more instances of the same application(s). In addition, other embodiments can implement different number of virtual machines per virtualization server than shown, and a virtualization server can include additional computing devices that each implement the same or different number of virtual machines than other computing devices within the same virtualization server.

Virtualization server 310 also implements hypervisor 250. Hypervisor 250 includes a scheduling module 320, throttling module 260, and a credit module 340. In turn, scheduling module includes a QoS scheduler 330, throttling module includes QoS module 270, and credit module 340 implements workload module 350.

Storage system 110 includes first storage layer 120(1) and second storage layer 120(2). First storage layer 120(1) includes first layer storage unit 130(1), and second storage layer 120(2) includes second layer storage unit 130(2). First storage layer 120(1) also includes a storage queue 290. As shown in FIGS. 2 and 3, storage system 110 can be implemented as a hybrid storage system in a hybrid storage environment. For example, first layer storage unit 130(1) can be a SSD implemented in first storage layer 120(1) to provision a cache. Similarly, second layer storage unit 130(2) can be a HDD implemented in second storage layer 120(2) to provision a backing data store.

In some embodiments, hypervisor 250 can use scheduling module 320 to schedule a performance evaluation of the storage service being provided to virtual machines 230(1)-(N) by the storage system 110. For example, scheduling module 320 can QoS scheduler 330 to schedule such a performance evaluation. In other embodiments, the hypervisor can use the throttling module to perform adaptive throttling of write operations generated by applications 240(1)-(N). Such adaptive throttling of write operations can be based on quality of service feedback received by the hypervisor from the storage system (e.g., via QoS module 270). In addition, such adaptive throttling of write operations can be performed based on credit values assigned, allocated, and/or distributed to virtual machines 230(1)-(N) by the hypervisor. The hypervisor can use the credit module to assign, allocate, or distribute such credits to the virtual machines based on the virtual machine workloads as managed by the workload module.

In one embodiment, credit module 340 computes and assigns a credit value to virtual machine 230(1). The credit value can be assigned, for example, to virtual machine 230(1) in proportion to one or more static measures, and one or more dynamic conditions. For instance, hypervisor 250 can receive an input that includes information indicative of the quality of service experienced by virtual machine 230(1), and based on the input, the credit value can be assigned to virtual machine 230(1). In this example, the one or more static measures, and the one or more dynamic conditions are used to calculate the quality of service. As noted, application 240(1) executing on virtual machine 130(1) generates one or more I/O operations. These one or more I/O operations, generated by application 240(1), for example, are throttled based on the credit value assigned to virtual machine 230(1).

I/O throttling (or more simply, throttling) can be used to control the rate at which data processing is performed. For example, in the present setting, if the first layer storage unit is at the risk of overflowing (e.g., the storage capacity of the SSD is getting full), throttling can be used to control the processing of write operations from one or more virtual machines. Write operations are thus processed at a rate that allows storage systems involved to successfully process such writes. In certain embodiments, such writes are executed in the order in which the write operation was received at the first layer storage unit, though this need not be the case. Storage queue 255 can be used to keep track of the order of write operations, and the order of their arrival at the first storage layer (or first layer storage unit).

In some embodiments, the quality of service is a level of storage service provided to the virtual machine(s) by a storage system. In this example, the static measures indicate a priority level of the virtual machine, and the dynamic conditions indicate a demand level of the virtual machine. Static measures can include, but are not limited to, device characteristics, network bandwidth, etc. Dynamic conditions can include, but are not limited to, level of network congestion, queue fill level, etc. Because the static measures and the dynamic conditions are used to calculate the quality of service, several considerations can be taken into account.

Static measures indicate a priority level of the virtual machine. In some embodiments, the priority level of a virtual machine is dictated (and specified) by an SLA. For instance, an SLA associated with virtual machine 230(1) can require virtual machine 230(1) to perform ten thousand (10,000) IOPS, and at a minimum, can require virtual machine 230(1) to perform five thousand (5,000) IOPS. Therefore, in this example, a virtual machine with an SLA requirement of a minimum of five thousand (5,000) IOPS will have a higher priority than another virtual machine with an SLA requirement of a minimum of three thousand (3,000) IOPS.

Dynamic conditions indicate a demand level of the virtual machine. The demand level of a virtual machine (e.g., virtual machine 230(1)) can be determined based on the arrival rate of I/O operations at the first layer storage unit, for example. The arrival rate of I/O operations refers to the number of I/O operations that are received by the first layer storage unit (e.g., at storage queue 255) during a given time. However, the ability of a storage device (or storage unit) (e.g., an SSD implemented in the first storage layer) to successfully complete and fulfill one or more I/O operations is dependent on device characteristics and operational characteristics of the storage device (or storage unit). Therefore, in some embodiments, dynamic conditions related to the performance of the storage unit (or storage device) in question can also be taken into consideration in calculating the quality of service.

In one embodiment, QoS module 270 determines the number of I/O operations that storage system 110 can tolerate. The QoS module measures the latency of an I/O operation. Latency refers to the amount of time needed for a single I/O request to complete from the application's perspective. In this example, based on the latency of the I/O operation, QoS module determines the queue depth of the storage device (to which the I/O operation is performed). Queue depth refers to the number of I/O requests that can be queued at a given point in time on a storage controller (e.g., in storage queue 255). For instance, each I/O request from a host's initiator to a storage controller's target adapter consumes a queue entry. In this manner, dynamic conditions such as the latency of a storage device as well as associated device characteristics (e.g., queue depth) are taken into consideration in calculating the demand level of a virtual machine, and consequently, the quality of service provided to (or capable of being provided to) the virtual machine by a storage system.

In some embodiments, the calculation of the quality of service includes comparing a first priority level and a first demand level associated with virtual machine 230(1) to a second priority level and a second demand level for a second virtual machine (e.g., virtual machine 230(N)). As a result of the comparing, a second credit value is assigned to the second virtual machine that is different than the credit value assigned to the virtual machine. In this example, another application executing on the second virtual machine (e.g., application 240(N) executing on virtual machine 130(N)) generates a second set of I/O operations to storage system 110. As a result of assigning the second credit value, the second set of I/O operations are throttled based on the second credit value.

In certain embodiments, static measures can be based on a first set of device characteristics of first layer storage unit 130(1), and a second set of device characteristics of second layer storage unit 130(2), as well as a first set of operational characteristics of first layer storage unit 130(1), and a second set of operational characteristics of second layer storage unit 130(2). In this example, the first set of operational characteristics include a first latency associated with first layer storage unit 130(1), and the second set of operational characteristics include a second latency associated with second layer storage unit 130(2). It should be noted that, the sum of all I/O operations generated by the applications executing on the virtual machines (e.g., applications 240(1)-(N) executing on virtual machines 230(1)-(N)) does not exceed a bandwidth of second layer storage unit 130(2).

In other embodiments, the priority level of the virtual machine is based on an SLA with which the virtual machine is associated. The throttling can be performed based on the credit value assigned to the virtual machine, and watermark levels associated with the front end log. In this example, the performance of the throttling does not negatively impact the SLA. Therefore, as a result of the throttling, the virtual machined are able to meet the static measures in the SLA with which the virtual machines are associated.

For example, Watermark L1 can indicate that first layer storage unit 130(1) is seventy percent (70%) full. In this example, throttling module 260 throttles write operations such that the write operations are throttled thirty percent (30%) of previously executed writes. Read operations (or, more simply, reads) are served at one hundred percent (100%). In another example, Watermark L2 can indicate that first layer storage unit 130(1) is eighty percent (80%) full. In this another example, throttling module 260 throttles writes such that the writes are throttled twenty percent (20%) of the previously executed writes. Reads are served at one hundred percent (100%). In yet another example, Watermark L3 can indicate that first layer storage unit 130(1) is ninety percent (90%) full. In this yet another example, throttling module 260 throttles writes such that the writes served are based on just the minimum IOPS (as specified in the SLA). Reads are served at one hundred percent (100%). In a final example, Watermark L4 can indicate that first layer storage unit 130(1) is ninety percent (95%) full. In this final example, throttling module 260 throttles writes such that the writes served are only fifty percent (50%) of minimum IOPS (as specified in the SLA), and if the application is write sensitive, then the SLA associated with the virtual machine(s) generating the write(s) can be negatively affected.

In the above examples, the term "Watermark" refers to the amount of resources consumed, and the risk of overflow (or overload) of first layer storage unit 130(1). By implementing multiple watermark levels, QoS module 270 can perform throttling in a manner that takes into account available resources (and so, at least in part, providing for adaptive throttling). For example, if the watermark level reaches sixty percent (60%), QoS module 270 can permit writes from high priority application(s), while performing minimal throttling for low priority application(s). In this manner, QoS module 270 can take various throttling-based actions based on different watermark levels. It should be noted that the watermark levels are reported to QoS module 270 in ascending order of severity. However, when a request to stop throttling is received (e.g., an "un-throttle" request), the un-throttle request is received in descending order of severity. It should be noted that in certain embodiments, both reads and writes can be throttled, and in some other embodiments, only reads can be throttled.

It should be also be noted that requests for write operations are served according to the credit value(s) issued to the application (e.g., by credit module 340) at Watermark L1. Consequently, the requirement(s) in the SLAs (e.g., static metrics indicative of the priority level) and the demand level is guaranteed until Watermark L3. At Watermark L2, the writes are submitted to the storage system in an earliest deadline first manner so that even during throttling, the I/O response time to a performance-sensitive application can be maintained.

Therefore, the I/O response time is proportional to the priority level and demand level of the virtual machine because throttling is performed based on credit value(s) that are assigned to virtual machine workloads in proportion to the priority level and the demand level. Consequently, because throttling is based on QoS feedback received at hypervisor 250, the throttling is performed differently based on the watermark level reached (as well as the given level of service to be provided to a given virtual machine), as noted in the examples above. In addition, a smoothened read-write ratio is maintained for each application by QoS module 270. In certain embodiments, reads are not (and/or may not need to be) throttled (e.g., because reads do not consume storage space on first layer storage unit 130(1)), but writes are throttled according to application write ratios. In this manner, adaptive throttling can ensure that the emptying rate of writes from first layer storage unit 130(1) to second layer storage unit 130(2) keeps up with the arrival rate of income writes without negatively affecting the priority level and the demand level of virtual machine workloads.

Distributing Credits for Throttling

Figure 4:
FIG. 4 is a table that illustrates how various virtual machine workloads are throttled differently based on assigned credits, according to one embodiment of the present disclosure.

FIG. 4 is a table that illustrates how various virtual machine workloads are throttled differently based on assigned credits, according to one embodiment. Application workloads of virtual machines 230(1)-(N) can be throttled efficiently based on assigning credit value(s) to such application workloads. These credit value(s) are assigned (or distributed and/or allocated) in proportion to the priority level and the demand level of each application workload.

According to FIG. 4, virtual machine 230(1) is associated with a Platinum SLA. Priority level field 420 indicates that virtual machine 230(1) has a priority level of 10 (the highest priority level). A high priority level can indicate that one or more applications executing on virtual machine 230(1) are important and/or high priority applications. Further, demand level field 430 indicates that virtual machine 230(1) has a demand level of 10 (the highest demand level). A high demand level can indicate that the arrival rate of writes from virtual machine 230(1) is high (e.g., virtual machine 230(1) is generating a lot of writes).

Quality of service field 440 indicates the quality of service being provided to virtual machine 230(1) by storage system 110. For example, dynamic conditions associated with first layer storage unit 130(1) can include device characteristics and operating characteristics (e.g., the queue depth of the storage unit, latency of the storage unit, etc.). These dynamic conditions can affect the demand level (e.g., based on the arrival rate of writes) of the virtual machine workloads. Therefore, based on the static measures indicative of the priority level of virtual machine 230(1) as well as the dynamic conditions indicative of the demand level of virtual machine 230(1), credit module 340 assigns a credit value to virtual machine 230(1).

Based on the assigned credit value, throttling module 260 performs a low level of throttling of the workload of virtual machine 230(1). Instead, as shown in FIG. 4, throttling module 260 throttles writes from virtual machines 230(2)-(N) at a higher level (compared to virtual machine 230(1)), albeit differently. As shown in FIG. 4, the writes from virtual machines 230(2)-(N) are throttled differently based on the application workload(s) of these virtual machines 230(2)-(N), static measures (e.g., as indicated in service level agreement field 410), and dynamic conditions associated with virtual machines 230(2)-(N) (e.g., as indicated in priority level field 420 and demand level field 430), and the quality of service provided to virtual machines 230(2)-(N) by storage system 110 (e.g., as indicated in quality of service field 440). As previously noted, the throttling is performed based on the credit value assigned to virtual machines 230(2)-(N) (e.g., as indicated in credit value field 450).

Figure 5:
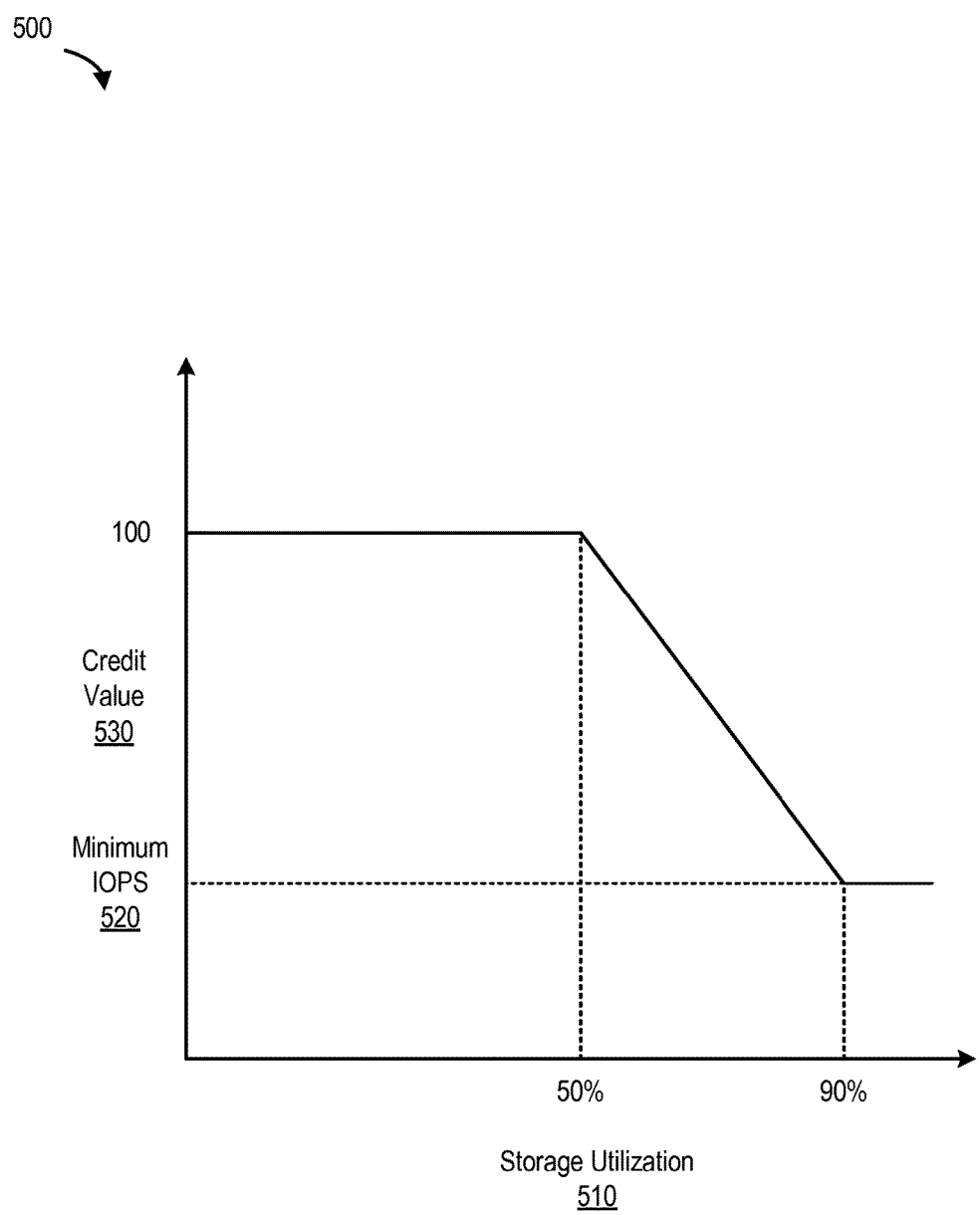
FIG. 5 is a graph that illustrates the relationship between storage utilization and credit values, according to one embodiment of the present disclosure.

FIG. 5 is a graph that illustrates the relationship between storage utilization and credit values, according to one embodiment of the present disclosure. As shown in FIG. 5, credit value 530 is distributed based on the percent of storage utilization 510. As previously noted, with respect to the watermark levels, the throttling is proportional to the storage capacity remaining on first layer storage unit 130(1).

However, the credit value(s) are distributed in a manner such that the performance of the virtual machine workload never falls below the minimum IOPS (e.g., as specified in an SLA associated with the virtual machine), and also never exceeds the maximum latency. For example, a credit distribution algorithm is executed by credit module 340, and distributes different credit values to different virtual machines based on the demand level and the priority level. Therefore, the impact of the throttling is based on the priority of the workload of the virtual machine, and is thus not performed in an arbitrary or indiscriminate manner.

Processes to Perform Adaptive Throttling

Figure 6A:
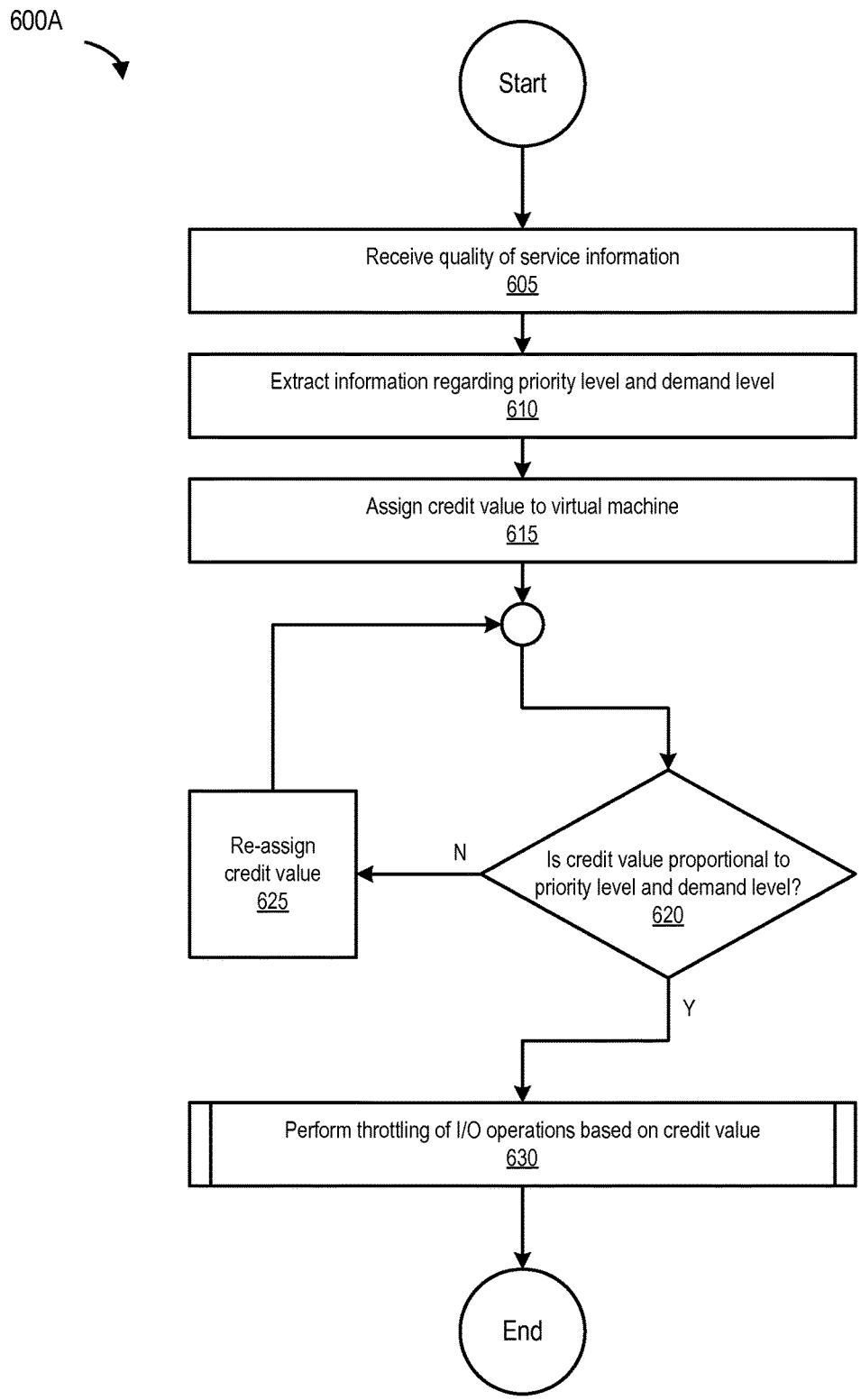
FIG. 6A is a flowchart that illustrates a process for performing I/O throttling based on credit values, according to one embodiment of the present disclosure.

FIG. 6A is a flowchart that illustrates a process for performing I/O throttling based on credit values, according to one embodiment. The process begins at 605 by receiving quality of service information (e.g., at QoS module 270 on hypervisor 250). At 610, the process extracts information regarding priority level and demand level associated with the virtual machine workload. At 615, the process assigns a credit value to the virtual machine. The credit value is assigned to the virtual machine in proportion to one or more static measures and one or more dynamic conditions.

At 620, the process determines whether the credit value is proportional to the priority level and the demand level. If the credit value is not proportional to the priority level and the demand level, the process, at 625, re-assigns the credit value. However, if the credit value is proportional to the priority level and the demand level, the process ends at 630 by performing throttling of I/O operations (e.g., writes) based on the (assigned) credit value.

Figure 6B:
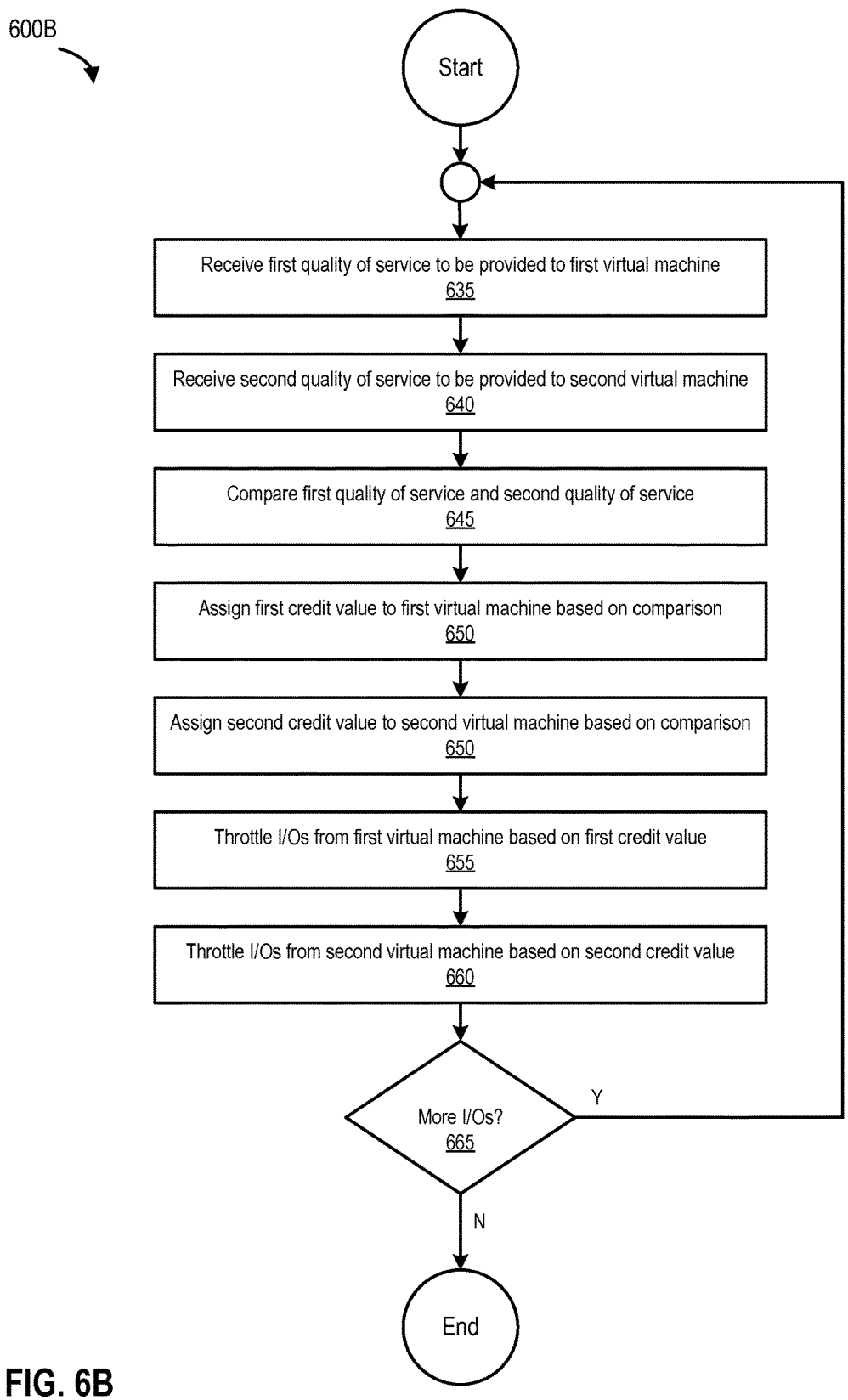
FIG. 6B is a flowchart that illustrates a process for throttling different virtual machine workloads differently based on different credit values, according to one embodiment of the present disclosure.

FIG. 6B is a flowchart that illustrates a process for throttling different virtual machine workloads differently based on different credit values, according to one embodiment of the present disclosure. The process begins at 635 by receiving a first quality of service to be provided to a first virtual machine (e.g., quality of service provided to virtual machine 230(1) by storage system 110, first layer storage unit 130(1), and/or second layer storage unit 130(2)). At 640, the process receives a second quality of service to be provided to a second virtual machine. At 645, the process compares the first quality of service and the second quality of service. At 650, the process assigns a first credit value to the first virtual machine based on the comparison, and at 655, assigns a second credit value to the second virtual machine based on the comparison.

At 655, the process throttles I/O operations (e.g., writes, not reads) from the first virtual machine based on the first credit value. At 660, the process throttles I/O operations (e.g., writes, not reads) from the second virtual machine based on the second credit value. At 665, the process determines if there are any more I/O operations. If there are no more I/O operations, the process ends at 665.

Figure 6C:
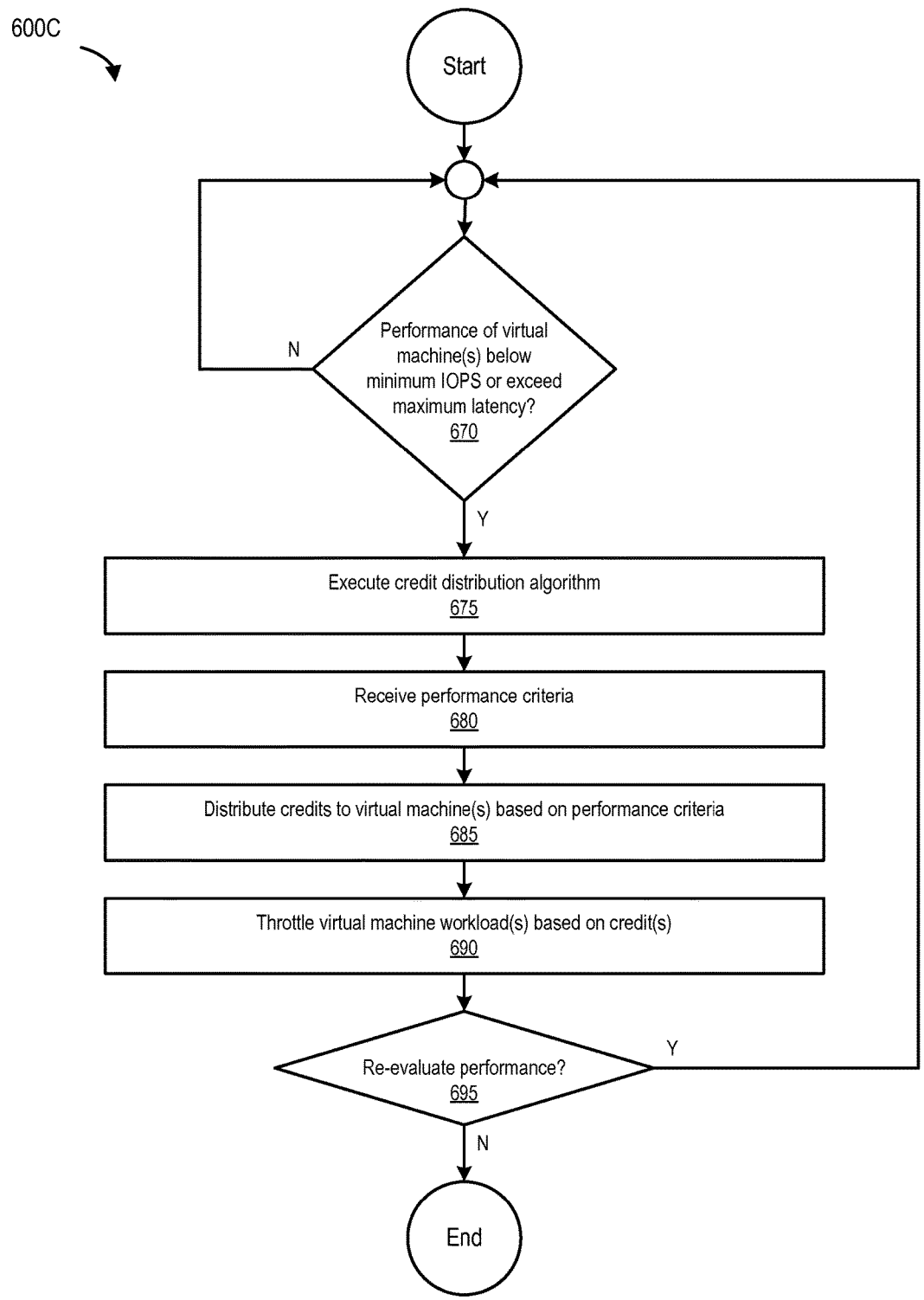
FIG. 6C is a flowchart that illustrates a process for evaluating the performance of a virtual machine, according to one embodiment of the present disclosure.

FIG. 6C is a flowchart that illustrates a process for evaluating the performance of a virtual machine, according to one embodiment. The process begins at 670 by determining whether the performance of a virtual machine is below minimum IOPS or exceeds maximum latency. The performance evaluation process can be scheduled using scheduling module 320 that implements QoS scheduler 330. If the performance of the virtual machine (e.g., performance of the workload of the virtual machine) is below minimum IOPS or exceeds maximum latency, the process, at 675, executes the credit distribution algorithm (e.g., using credit module 340).

At 680, the process receives performance criteria (e.g., using workload module 350). The performance criteria can include at least one of more of the following: static measures or others requirements specified in an SLA associated with the virtual machine indicative of a priority value of the virtual machine, and/or dynamic conditions such as a first set of device characteristics of the first layer storage unit (e.g., queue depth of the first layer storage unit), and a second set of device characteristics of the second layer storage unit (e.g., queue depth of the second layer storage unit), as well as a first set of operational characteristics of the first layer storage unit (e.g., a latency of the first layer storage unit), and a second set of operational characteristics of the second layer storage unit (e.g., a latency of the second layer storage unit).

The process, at 685, issues, distributes, allocates, and/or assigns credits (e.g., credit values) to the virtual machine(s) based on the performance criteria (e.g., using credit module 340), and at 690, throttles the write operations generated by the virtual machine based on the issued, distributed, allocated, and/or assigned credits (e.g., using throttling module 260). At 695, the process ends by determining whether the performance of the virtual machine (e.g., the virtual machine's workload) has to be re-evaluated. For example, implementing a new virtual machine in virtualization server 310 and/or executing one or more new application(s) in one or more existing virtual machines (e.g., virtual machines 230(1)-(N)) may require the performance of that virtual machine to be re-evaluated.

Figure 7A:
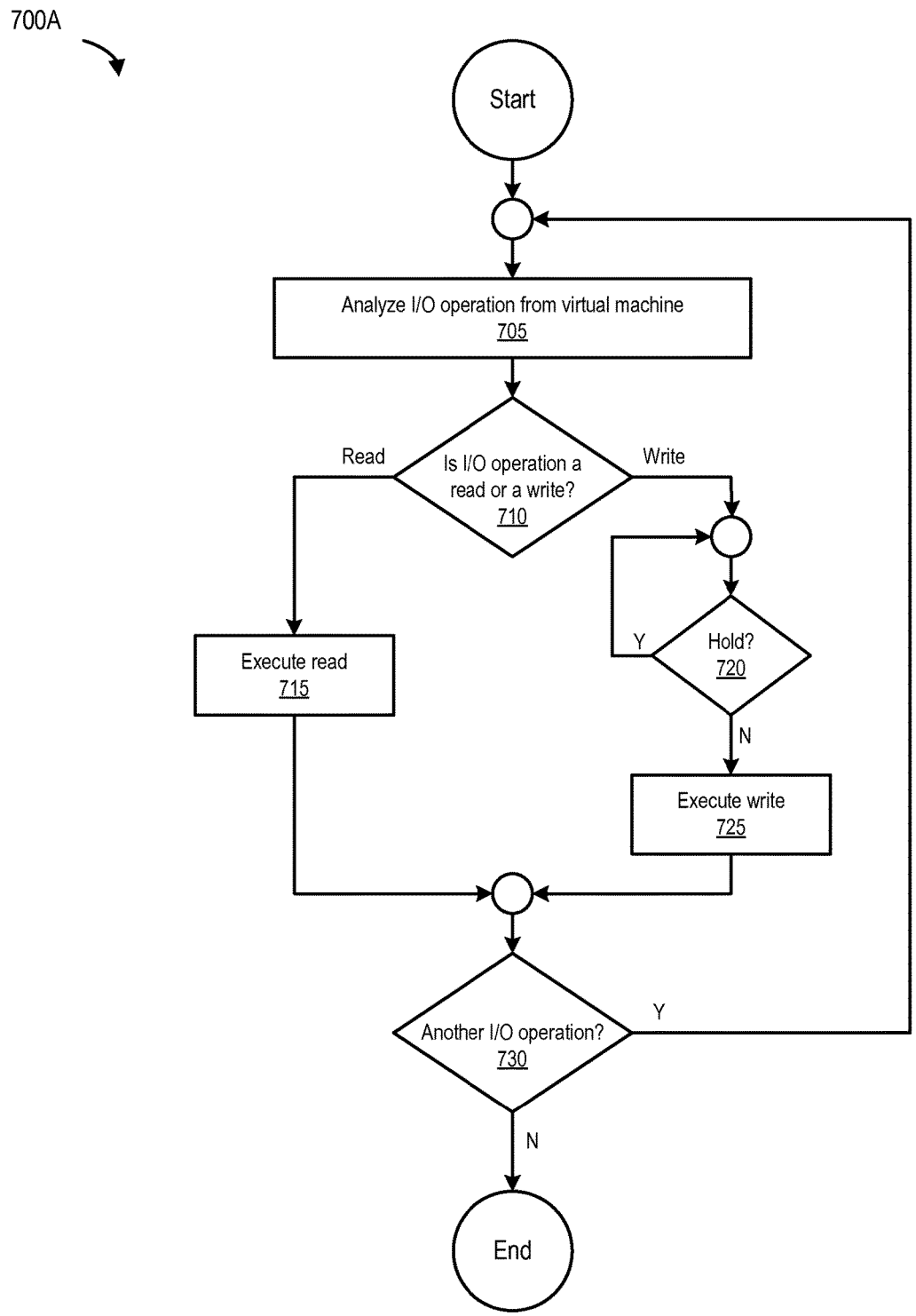
FIG. 7A is a flowchart that illustrates a process for analyzing I/O operations, according to one embodiment of the present disclosure.

FIG. 7A is a flowchart that illustrates a process for analyzing I/O operations to perform operation-by-operation throttling, according to one embodiment. The process begins at 705 by analyzing an I/O operation from a virtual machine (e.g., a write generated by application 240(1) executing on virtual machine 230(1). At 710, the process determines whether the I/O operation is a read or a write. If the I/O operation is a read, the process, at 715, executes the read (e.g., performs the read to first layer storage unit 130(1) or second layer storage unit 130(2)).

However, if the I/O operation is a write, the process, at 720, determines whether to hold the write. For example, throttling module 260 can hold the write, and the holding of the write can be triggered by a watermark level, as noted previously. Holding the write involves throttling the write based on assigned credit values. At 725, the process executes the write (e.g., performs the write to first layer storage unit 130(1)). At 730, the process ends by determining if there is another I/O operation that requires analysis.

Figure 7B:
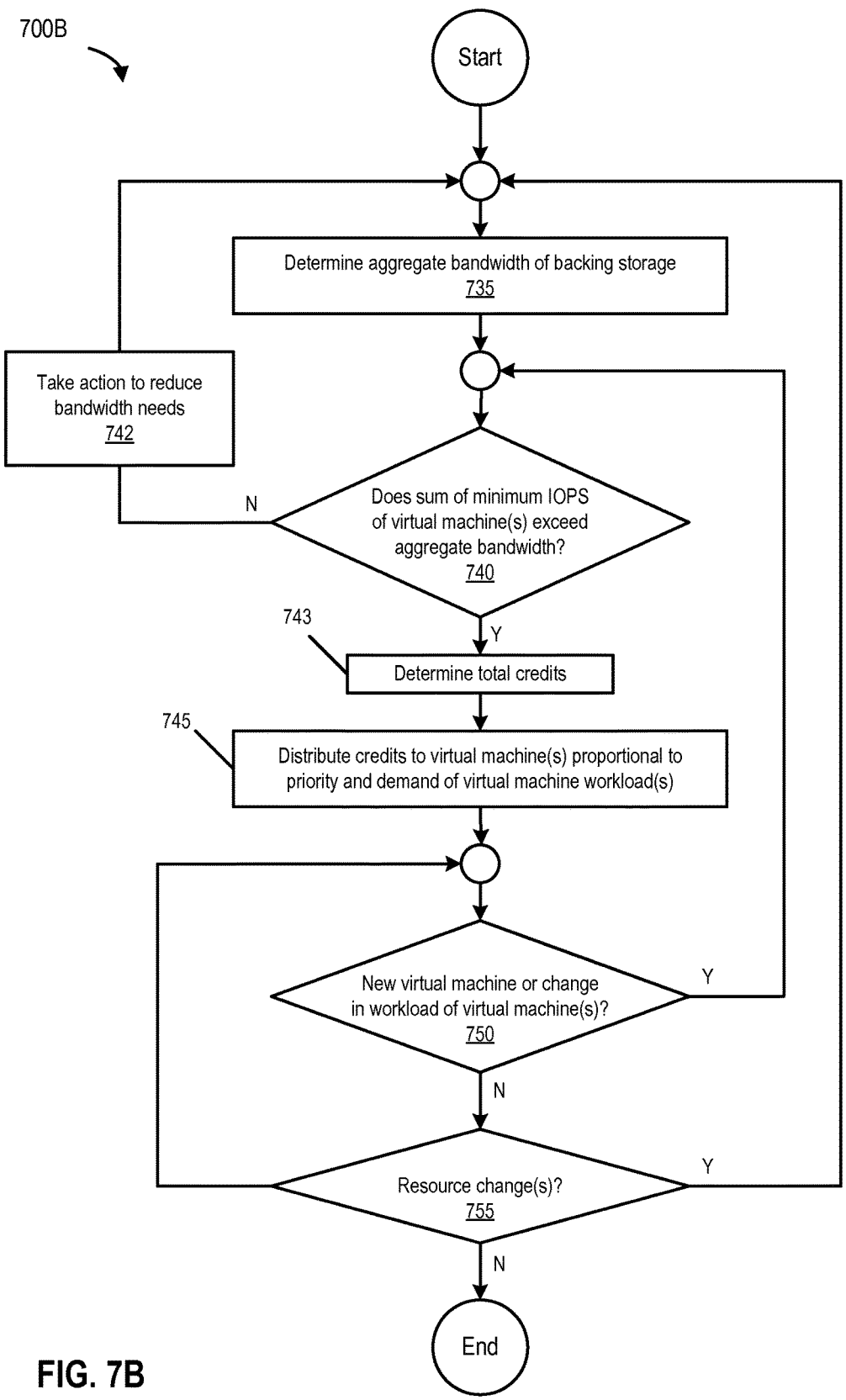
FIG. 7B is a flowchart that illustrates a process for distributing credit(s) to virtual machine(s), according to one embodiment of the present disclosure.

FIG. 7B is a flowchart that illustrates a process for distributing credit(s) to virtual machine(s), according to one embodiment of the present disclosure. The process begins at 735 by determining the bandwidth of backing storage (e.g., a HDD, and/or second layer storage unit 130(2)). At 740, the process determines whether the sum of minimum IOPS of virtual machines exceeds the aggregate bandwidth (of the backing storage). If the sum of minimum IOPS of the virtual machines exceeds the aggregate bandwidth, the process, at 742, takes action to reduce bandwidth needs.

If the sum of minimum IOPS of virtual machines (e.g., as specified in the SLAs associated with the virtual machines) exceeds the aggregate bandwidth, the process, at 743, determines total credits. At 745, the process distributes credits to virtual machines proportional to priority and demand of the virtual machines workload(s). At 750, the process determines whether the virtualization server implements a new virtual machine, or whether there is a change in the workload of existing virtual machine(s), or both. The process ends at 755 by determining whether there are resource changes (e.g., to the HDD, and/or second layer storage unit 130(2)).

Figure 7C:
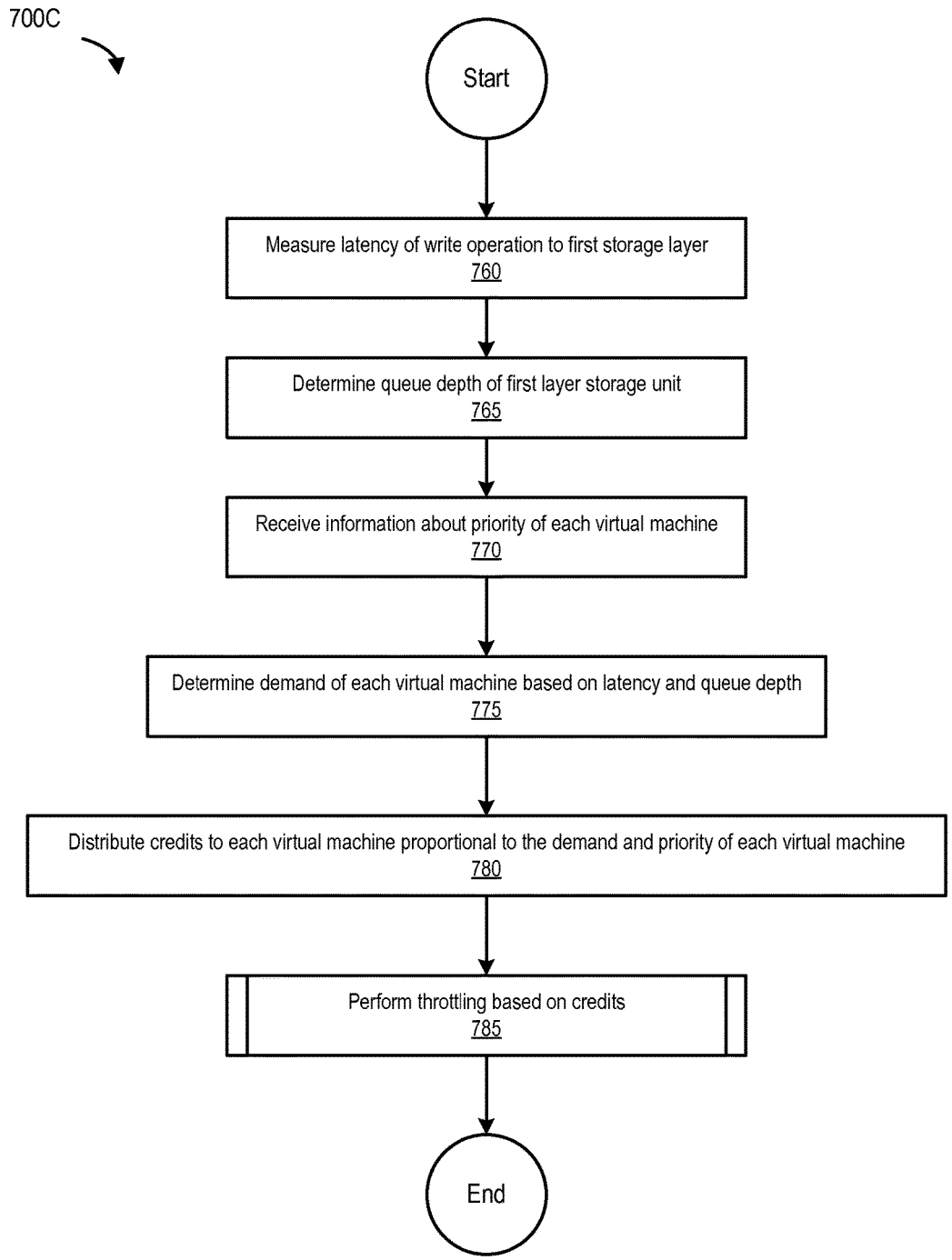
FIG. 7C is a flowchart that illustrates a process for performing throttling based on credits, according to one embodiment of the present disclosure.

FIG. 7C is a flowchart that illustrates a process for performing throttling based on credits, according to one embodiment. The process begins at 760 by measuring the latency of a write operation to the first storage layer (e.g., to first layer storage unit 130(1)). At 765, the process determines the queue depth of the first layer storage unit. At 770, the process receives information about the priority of each virtual machine (e.g., as specified in an SLA).

At 775, the process determines the demand of each virtual machine based on the latency (measured at 760) and queue depth (determined at 765). At 780, the process distributes credits (e.g., credit values) to each virtual machine proportional to the demand and the priority of each virtual machine (e.g., based on the quality of service which can be calculated using the demand and the priority). The process ends at 785 by performing throttling based on credits (e.g., when the storage capacity of first layer storage unit 130(1) reaches a certain watermark level as discussed above).

Figure 7D:
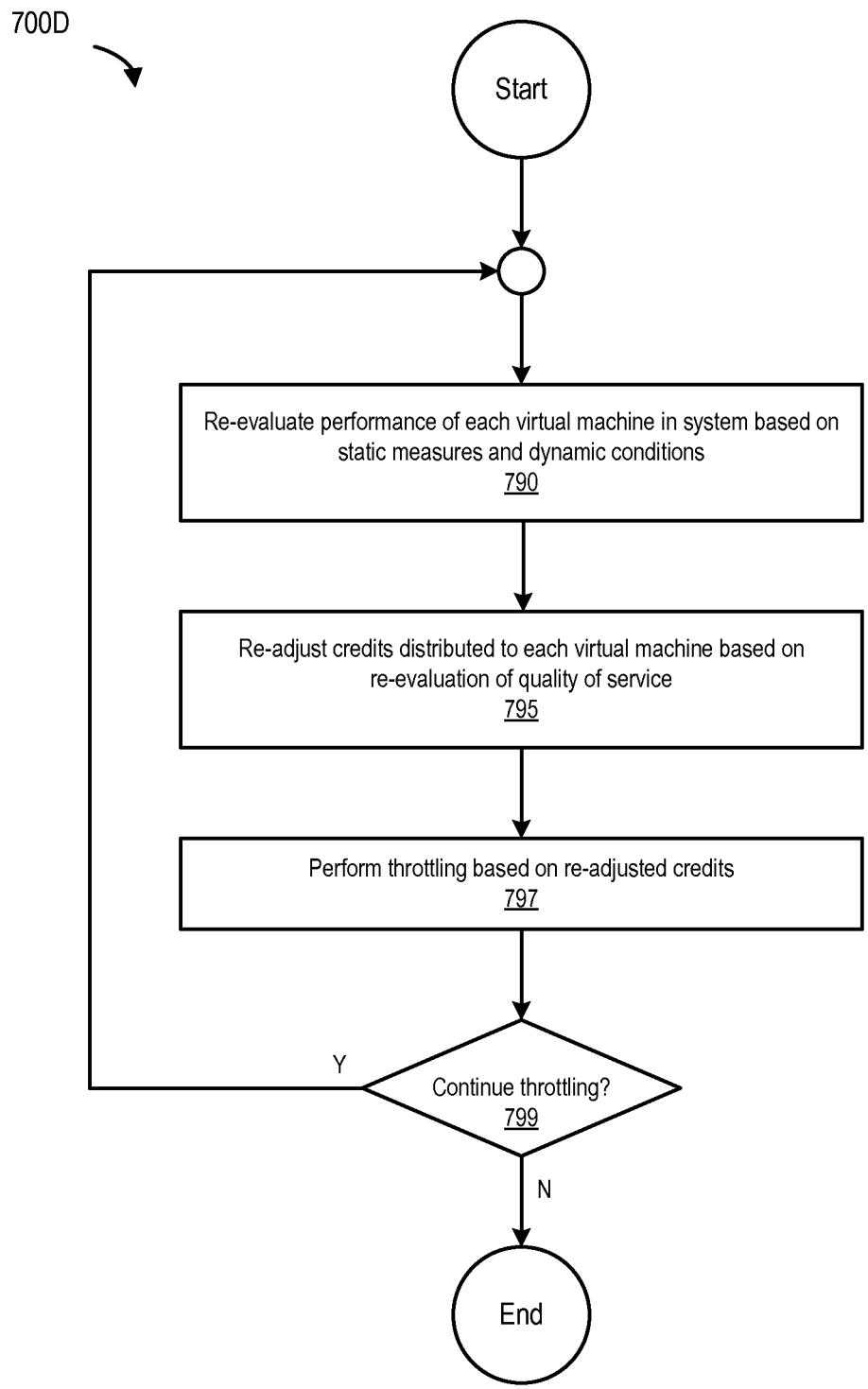
FIG. 7D is a flowchart that illustrates a process for performing throttling based on re-adjusted credits, according to one embodiment of the present disclosure.

FIG. 7D is a flowchart that illustrates a process for performing throttling based on re-adjusted credits, according to one embodiment of the present disclosure. The process begins at 790 by re-evaluating the performance of each virtual machine in the virtualization server based on static measures and dynamic conditions. At 795, the process re-adjusts credits distributed to each virtual machine based on the re-evaluation of the quality of service. At 797 the process performs throttling based on re-adjusted credits, and ends at 799 by determining whether to continue throttling.

Therefore, in this manner, the methods, systems, and processes described herein can be used to perform adaptive throttling of I/O operations in hybrid storage environments.

An Example Computing Environment

Figure 8:
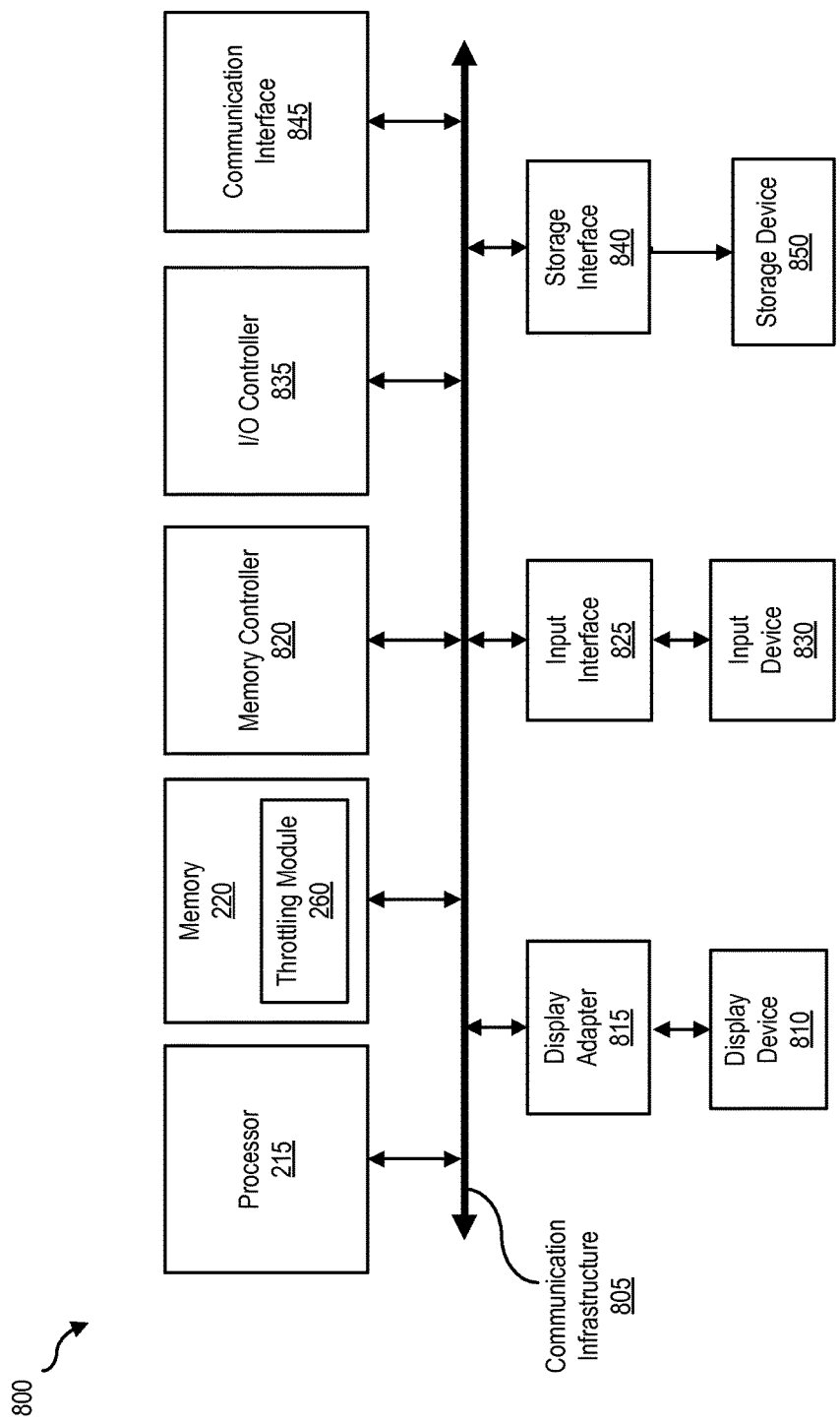
FIG. 8 is a block diagram of a computing system, illustrating how a throttling module can be implemented in software, according to one embodiment of the present disclosure.

FIG. 8 is a block diagram of a computing system, illustrating how a throttling module can be implemented in software, according to one embodiment. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 215 and a memory 220. By executing the software that implements computing device 210, and/or virtualization server 310, computing system 800 becomes a special purpose computing device that is configured to perform adaptive throttling of I/O operations in hybrid storage environments.

Processor 215 generally represents any type or form of processing unit capable of processing data or interpreting and executing instructions. In certain embodiments, processor 215 may receive instructions from a software application or module. These instructions may cause processor 215 to perform the functions of one or more of the embodiments described and/or illustrated herein. For example, processor 215 may perform and/or be a means for performing all or some of the operations described herein. Processor 215 may also perform and/or be a means for performing any other operations, methods, or processes described and/or illustrated herein.

Memory 220 generally represents any type or form of volatile or non-volatile storage device or medium capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing a credit module and a throttling module may be loaded into memory 220.

In certain embodiments, computing system 800 may also include one or more components or elements in addition to processor 215 and memory 220. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type or form of device capable of handling memory or data or controlling communication between one or more components of computing system 800. For example, in certain embodiments memory controller 820 may control communication between processor 215, memory 220, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 215, memory 220, communication interface 845, display adapter 815, input interface 825, and storage interface 840.

Communication interface 845 broadly represents any type or form of communication device or adapter capable of facilitating communication between computing system 800 and one or more additional devices. For example, in certain embodiments communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. In at least one embodiment, communication interface 845 may provide a direct connection to a remote server via a direct link to a network, such as the Internet. Communication interface 845 may also indirectly provide such a connection through, for example, a local area network (such as an Ethernet network), a personal area network, a telephone or cable network, a cellular telephone connection, a satellite data connection, or any other suitable connection.

In certain embodiments, communication interface 845 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing. For example, communication interface 845 may receive instructions from a remote device or send instructions to a remote device for execution.

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810.

As illustrated in FIG. 8, computing system 800 may also include at least one input device 830 coupled to communication infrastructure 805 via an input interface 825. Input device 830 generally represents any type or form of input device capable of providing input, either computer or human generated, to computing system 800. Examples of input device 830 include, without limitation, a keyboard, a pointing device, a speech recognition device, or any other input device.

As illustrated in FIG. 8, computing system 800 may also include storage device 850 to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800.

In certain embodiments, storage device 850 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 115 and/or various portions of storage device 850. When executed by processor 110, a computer program loaded into computing system 800 may cause processor 110 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

An Example Networking Environment

Figure 9:
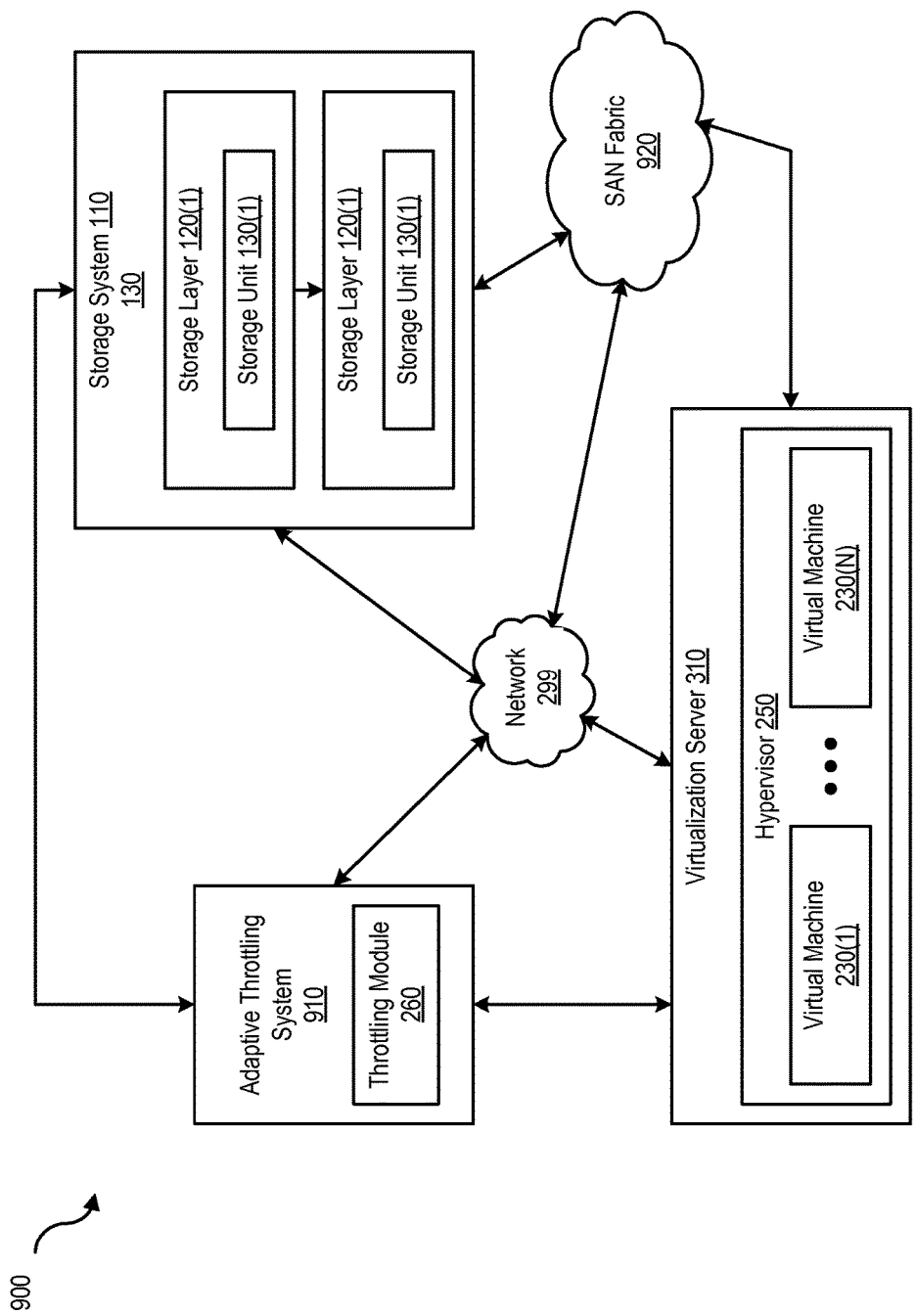
FIG. 9 is a block diagram of a networked system, illustrating how various computing devices can communicate via a network, according to one embodiment of the present disclosure.

FIG. 9 is a block diagram of a networked system, illustrating how various computing devices can communicate via a network, according to one embodiment of the present disclosure. In certain embodiments, network-attached storage (NAS) devices may be configured to communicate with virtualization server 310 using various protocols, such as Network File System (NFS), Server Message Block (SMB), or Common Internet File System (CIFS).

Network 299 generally represents any type or form of computer network or architecture capable of facilitating communication between multiple computing devices. Network 299 may facilitate communication between virtualization server 310 and storage system 110. In certain embodiments, and with reference to computing system 800 of FIG. 8, a communication interface, such as communication interface 845 in FIG. 8, may be used to provide connectivity between virtualization server 310 and network 299. It should be noted that the embodiments described and/or illustrated herein are not limited to the Internet or any particular network-based environment. For example, network 299 can be a Storage Area Network (SAN).

In at least one embodiment, all or a portion of one or more of the embodiments disclosed herein may be encoded as a computer program and loaded onto and executed by virtualization server 310, virtual machines 230(1)-(N), and hypervisor 250, or any combination thereof. All or a portion of one or more of the embodiments disclosed herein may also be encoded as a computer program, stored on virtualization server 310, virtual machines 230(1)-(N), and/or hypervisor 250, and distributed over network 299.

In some examples, all or a portion of the computing device in FIG. 2 and virtualization server in FIG. 3 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, computing device 210, virtualization server 310, virtual machines 230(1)-(N), and/or hypervisor 250 may transform behavior of a computing device and/or virtualization server in order to cause the computing device and/or virtualization server to perform adaptive throttling of I/O operations in hybrid storage environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:
1. A method comprising:
   performing adaptive throttling of input/output (I/O) operations in a hybrid storage system by:
   assigning a credit value to a virtual machine of a plurality of virtual machines, wherein the credit value is assigned to the virtual machine in proportion to one or more static measures and one or more dynamic conditions, wherein the one or more static measures indicate a priority level of the virtual machine, wherein the one or more dynamic conditions indicate a demand level of the virtual machine, and wherein the one or more static measures and the one or more dynamic conditions are used to calculate a quality of service;
   calculating the quality of service by comparing the priority level and the demand level of the virtual machine, and another priority level and another demand level of another virtual machine of the plurality of virtual machines, wherein the quality of service is a level of storage service provided to the virtual machine by a storage system;
   executing an application on the virtual machine to generate the input/output (I/O) operations to the storage system; and
   throttling the input/output (I/O) operations based, at least in part, on the credit value.

2. The method of claim 1, further comprising:
receiving an input comprising information indicative of the quality of service; and
based on the input, performing the assigning of the credit value to the virtual machine.

3. The method of claim 2, wherein the storage system is a multi-layer storage device, the multi-layer storage device comprises a plurality of storage layers, and the plurality of storage layers represent a hierarchy of storage layers, wherein a first storage layer in the hierarchy of storage layers receives the input/output (I/O) operations prior to another storage layer in the hierarchy of storage layers, the first storage layer comprises a front end log, the another storage layer is a backing data store, the input/output (I/O) operations are not permanently stored on the first storage layer, and the first storage layer comprises a first storage device that serves the input/output (I/O) operations faster but is smaller in size than another storage device in the another storage layer.

4. The method of claim 3, wherein the application executing on the virtual machine performs the input/output (I/O) operations, wherein the input/output (I/O) operations are executed on the first storage layer, the input/output (I/O) operations comprise write operations, the write operations are written to the front end log maintained in the first storage layer, and data written by the write operations to the front end log is transferred from the first storage layer to the another storage layer for backup.

5. The method of claim 3, wherein the priority level of the virtual machine is based on a service level agreement with which the virtual machine is associated, and the demand level of the virtual machine is based on a first set of device characteristics of the first storage layer, and another set of device characteristics of the another storage layer respectively, and a first set of operational characteristics of the first storage layer, and another set of operational characteristics of the another storage layer, respectively.

6. The method of claim 5, wherein the first set of operational characteristics comprises, at least in part, a first latency associated with the first storage layer, and the another set of operational characteristics comprises, at least in part, another latency associated with the another storage layer.

7. The method of claim 5, wherein a performance of the throttling does not negatively impact the service level agreement with which the virtual machine is associated, and as a result of the throttling, the virtual machine is able to meet the one or more static measures in the service level agreement.

8. The method of claim 3, wherein the throttling is performed based, at least in part, on the credit value assigned to the virtual machine, and one or more watermark levels associated with the front end log.

9. The method of claim 3, wherein the priority level of the virtual machine is based on a service level agreement with which the virtual machine is associated, the demand level of the virtual machine is based on a first set of device characteristics of the first storage layer, and another set of device characteristics of the another storage layer respectively; and a first set of operational characteristics of the first storage layer, and another set of operational characteristics of the another storage layer, respectively, the first set of operational characteristics comprises, at least in part, a first latency associated with the first storage layer, and the another set of operational characteristics comprises, at least in part, another latency associated with the another storage layer.

10. The method of claim 1, further comprising:
as a result of the comparing, assigning another credit value to the another virtual machine, wherein the credit value and the another credit value are different.

11. The method of claim 10, wherein another application executing on the another virtual machine generates other I/O operations to the storage system, and as a result of the assigning the another credit value, the other I/O operations are throttled based on the another credit value.

12. The method of claim 6, wherein a sum of the input/output (I/O) operations generated by one or more applications executing on the plurality of virtual machines does not exceed a bandwidth of the another storage layer.

13. A non-transitory computer readable storage medium comprising program instructions executable to:
perform adaptive throttling of input/output (I/O) operations in a hybrid storage system by:
assigning a credit value to a virtual machine of a plurality of virtual machines, wherein the credit value is assigned to the virtual machine in proportion to one or more static measures and one or more dynamic conditions, wherein the one or more static measures indicate a priority level of the virtual machine, wherein the one or more dynamic conditions indicate a demand level of the virtual machine, and wherein the one or more static measures and the one or more dynamic conditions are used to calculate a quality of service;
calculating the quality of service by comparing the priority level and the demand level of the virtual machine, and another priority level and another demand level of another virtual machine of the plurality of virtual machines, wherein the quality of service is a level of storage service provided to the virtual machine by a storage system;
executing an application on the virtual machine to generate the input/output (I/O) operations to the storage system; and
throttling the input/output (I/O) operations based, at least in part, on the credit value.

14. The non-transitory computer readable storage medium of claim 13, further comprising: as a result of the comparing, assigning another credit value to the another virtual machine, wherein the credit value and the another credit value are different, another application executing on the another virtual machine generates other I/O operations to the storage system, and as a result of the assigning the another credit value, the other I/O operations are throttled based on the another credit value.

15. The non-transitory computer readable storage medium of claim 14, wherein the storage system is a multi-layer storage device, the multi-layer storage device comprises a plurality of storage layers, and the plurality of storage layers represent a hierarchy of storage layers, wherein a first storage layer in the hierarchy of storage layers receives the input/output (I/O) operations prior to another storage layer in the hierarchy of storage layers, the first storage layer comprises a front end log, the another storage layer is a backing data store, the input/output (I/O) operations are not permanently stored on the first storage layer, the first storage layer comprises a first storage device that serves the input/output (I/O) operations faster but is smaller in size than another storage device in the another storage layer, the application executing on the virtual machine performs the input/output (I/O) operations, wherein the input/output (I/O) operations are executed on the first storage layer, the input/output (I/O) operations comprise write operations, the write operations are written to the front end log maintained in the first storage layer, and data written by the write operations to the front end log is transferred from the first storage layer to the another storage layer for backup.

16. A system comprising:
   one or more processors; and
   a memory coupled to the one or more processors, wherein the memory stores program instructions executable by the one or more processors to:
perform adaptive throttling of input/output (I/O) operations in a hybrid storage system by:
   assigning a credit value to a virtual machine of a plurality of virtual machines, wherein the credit value is assigned to the virtual machine in proportion to one or more static measures and one or more dynamic conditions, wherein the one or more static measures indicate a priority level of the virtual machine, wherein the one or more dynamic conditions indicate a demand level of the virtual machine, wherein the one or more static measures and the one or more dynamic conditions are used to calculate a quality of service, wherein the quality of service is calculated by comparing the priority level and the demand level of the virtual machine, and another priority level and another demand level of another virtual machine of the plurality of virtual machines, and wherein the quality of service is a level of storage service provided to the virtual machine by a storage system;
   executing an application on the virtual machine to generate the input/output (I/O) operations to the storage system; and
   throttling the input/output (I/O) operations based, at least in part, on the credit value.

17. The system of claim 16, further comprising:
   receiving an input comprising information indicative of the quality of service; and
   based on the input, performing the assigning of the credit value to the virtual machine.

18. The system of claim 16, wherein the throttling is performed based, at least in part, on the credit value assigned to the virtual machine, and one or more watermark levels associated with a front end log.

19. The system of claim 16, wherein a performance of the throttling does not negatively impact a service level agreement with which the virtual machine is associated, and as a result of the throttling, the virtual machine is able to meet the one or more static measures in the service level agreement.

* * * * *